J. L. CREVELING.
ELECTRIC REGULATION.
APPLICATION FILED AUG. 17, 1916. RENEWED JAN. 23, 1922.
1,412,274.
Patented Apr. 11, 1922.
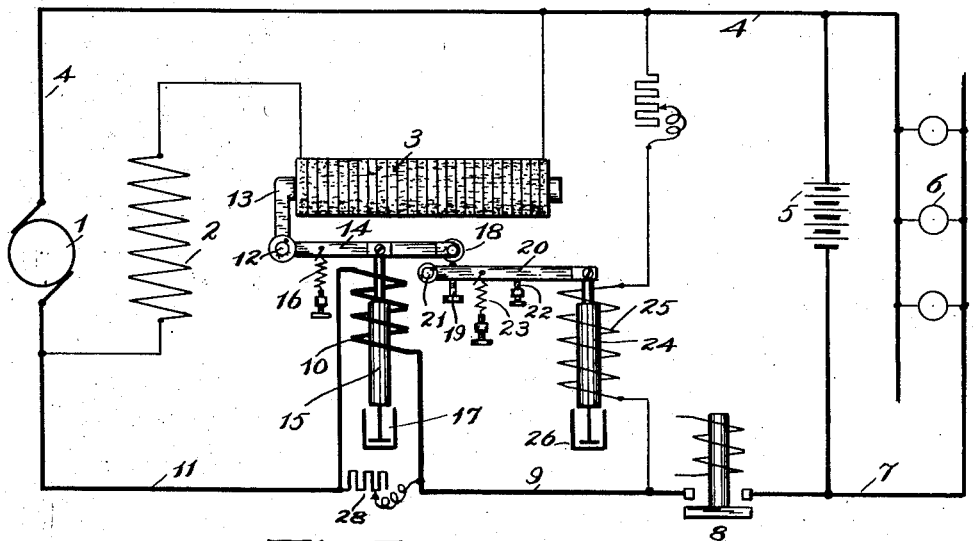
Fig. I.
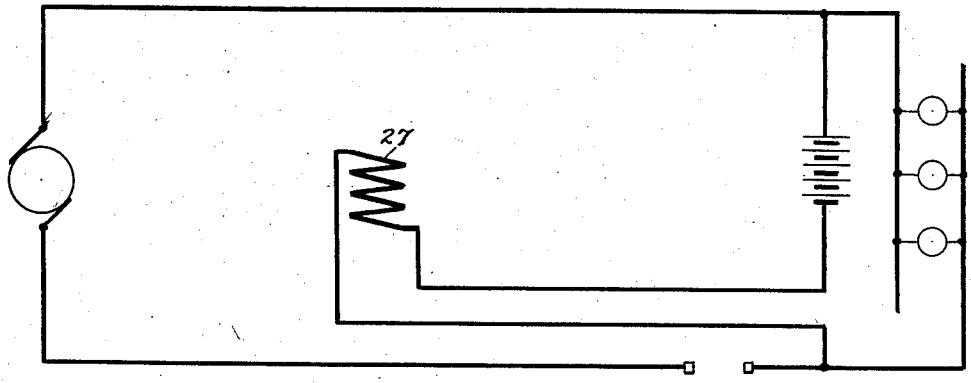
Fig. II.
INVENTOR
John L. Creveling

UNITED STATES PATENT OFFICE.

JOHN L. CREVELING, OF WHITE PLAINS, NEW YORK, ASSIGNOR TO GOULD COUPLER COMPANY, A CORPORATION OF NEW YORK.

ELECTRIC REGULATION.

1,412,274.    Specification of Letters Patent.    Patented Apr. 11, 1922.

Application filed August 17, 1916, Serial No. 115,422. Renewed January 23, 1922. Serial No. 531,313.

*To all whom it may concern:*

Be it known that I, JOHN L. CREVELING, a citizen of the United States, residing in White Plains, county of Westchester, and State of New York, have invented certain new and useful Improvements in Electric Regulation, of which the following is a description.

My invention pertains to that class of electric regulation wherein it is desired to regulate a controllable source of electrical potential difference and has for a particular object to provide means whereby said source may be automatically regulated in a predetermined manner. A further object of my invention is to provide means whereby the current in a circuit supplied from said source may be held within predetermined limits and means whereby the voltage across a circuit supplied by said source may also be held from exceeding a predetermined limit. As such systems of regulation are particularly useful for regulating a dynamo operating to charge a storage battery and maintain lamps or other translating devices and more especially when the dynamo is driven at variable speeds causing its voltage and consequent current output to tend to widely vary, my invention will be described with particular reference to such a system.

In the drawing, Fig. I. is a diagrammatic representation of one type of system embodying the essentials of my invention.

Fig. II. shows a portion of a system similar to that of Fig. I. in which a modification is shown without departing from my invention.

In the drawing, 1 represents a dynamo or generator provided with the usual field coil 2, having in series therewith a regulating device or element, in this instance indicated as a carbon pile 3, and it will be obvious that the dynamo may be regulated by regulating the pressure upon the said element 3 in a well known manner. 4 represents the positive lead of the dynamo which is in electrical communication with the positive side of the storage battery 5 and the positive terminals of lamps or other translating devices indicated at 6. The negative terminals of the translating devices 6 and the battery 5 are in communication with the lead 7 carried to one side of any suitable automatic switch indicated at 8. This switch, the mere presence of which is indicated in the drawing for the sake of clearness, is preferably one of the automatic variety adapted to close its circuit when the generator voltage is substantially equal to or slightly in excess of that of the storage battery and to open the circuit when the generator voltage falls very slightly below that of the storage battery in such manner as to prevent back discharge from the battery through the generator.

The opposite terminal of the switch 8 is connected as by the lead 9 with one end of the series coil or solenoid 10, the opposite end of which is connected as by lead 11 with the negative brush of the generator 1. 28 is a variable resistance which may be used to shunt the coil 10 for the purpose of adjustment. The pivot 12 carries a bellcrank lever having the branches 13 and 14 which are in fixed relation with regard to each other and rotatable about the said pivot, preferably with negligible friction. The branch 13 presses upon one end of the carbon pile 3, the opposite end of which is stationary, and manipulation of the said branch 13 will, therefore, regulate the generator by controlling the excitation of the field coil 2. The arm 14 carries the core 15 of iron or other magnetic material and is normally drawn in a downward direction by the adjustable spring 16. Coil 10 when energized tends to lift the core 15 against the action of the adjustable spring 16 so as to increase the resistance 3, while too sudden movement of the core is prevented by the dashpot mechanism 17. The lever 14 carries at its free extremity a sheave or roller 18 adapted to be engaged by the adjustable screw 19 carried by the lever 20 which is rotatably supported at one extremity by the pivot 21 and is normally drawn in a downward direction toward the stop 22 by the adjustable spring 23. The lever 20 carries at its free extremity a core of magnetic material 24, surrounded by the solenoid 25 in shunt across the generator and so arranged that, when energized, the said coil tends to raise the core 24 against the action of the adjustable spring 23 so as to bring screw 19 into contact with the sheave 18, whereupon further upward movement of the core 24 will decrease the pressure upon the pile 3 through the instrumentality of lever 14—13 in a well known manner. Too sudden movement of the core 24 is resisted by the dashpot 26.

In Fig. II. like numerals are used to indicate like parts and the coil 27 is shown in series with the battery 5. In the system of Fig. I., if the coil 10 be suppressed and the coil 27 of Fig. II. substituted in its stead, the core 15 will be affected by the current in the battery circuit only instead of the total generator output.

An operation of my invention is substantially as follows:

If the dynamo be at rest or running at low speed, the switch 8 will be open and translating devices 6 may be maintained by the battery 5 in a well known manner. If the generator have its voltage raised until in excess of that of the battery, the switch 8 will close and current will flow from the generator 1 through lead 4, battery 5 and translating devices 6, lead 7, switch 8, lead 9, coil 10 and its adjusting shunt 28 and lead 11 to the generator. Current will also flow through coil 25 which is shown in shunt across the generator and having in series therewith a variable resistance for the purpose of adjustment. This current will tend to raise the core 24 and lever 20 against the action of adjustable spring 23 and dashpot 26 in such manner as to cause the adjustable screw 19 to come into contact with the sheave 18, whereupon elevation of the plunger 24 will swing the lever 14—13 in a counter-clockwise direction and reduce the excitation of the field coil 2. And I so adjust the spring 23 and the variable resistance in series with the coil 25 that when the generator voltage reaches a predetermined maximum which it is desired shall not be exceeded in value, further rise in voltage will be prevented by the coil 25 lifting the core 24 and moving the lever 20 and the lever 14—13 as above outlined. By using a comparatively long-pull solenoid 25 of fairly liberal dimensions and a comparatively long lever 20 with the screw 19 comparatively near the pivot 21, I may cause the voltage to be held constant within quite narrow limits throughout a wide tendency of the generator to exceed the maximum voltage as the compound lever mechanism formed by levers 20 and 14 will cause movement of the lever 13—14 against considerable mechanical resistance upon small fluctuations in pull upon the core 24, and the operation will not be appreciably interfered with by comparatively large fluctuations in current in the coil 10 when below a predetermined value.

If the generator be operating and regulated by the voltage regulating means in the manner just described and a reduction be made in the resistance of the load circuit to such extent that the standard maximum voltage tends to increase the load upon the generator beyond a predetermined maximum, as for example its safe carrying capacity, I so adjust the spring 16 or shunt 28 that coil 10 will effectively tend to raise core 15 evenly against the action of dashpot 17 and assist the coil 25 in regulating the generator even to the extent at times of usurping the regulation entirely, as for example when the delivery of a maximum current may be caused by a voltage below that necessary to cause the coil 25 to increase the resistance 3, in which event, the core 15 will raise the lever 14 and perform the entire function of regulation. Then coil 25 will allow the core 24 to fall and the lever 20 to rest upon its stop 22. In such cases, if the battery voltage rise as the same becomes charged, it may rise to such a point that coil 25 will lift its core 24, bring the screw 19 into contact with the member 18 and assist the coil 10 in the regulation of the generator even to the point of usurping the function of the said coil 10 and performing the real or major regulation of the generator. And during such operation, ordinary fluctuations of current in the coil 10, so long as the current remains below the maximum value, will have little effect upon the regulation as being performed by the voltage responsive means, owing to the compound lever mechanism as above outlined.

The modification intended to be brought out in Fig. II. is the same as the operation of Fig. I. with the exception that the battery current only will affect the core 15 and the generator will be regulated with respect to battery current changes instead of main circuit current changes as in Fig. I.

I do not wish in any way to limit myself to any of the exact details of construction or modes of operation set forth above merely to portray an embodiment of my invention for it is obvious that wide departure both in construction and in operation may be made without departing from the spirit and scope of my invention which is as set forth in the following claims:

1. Regulating means comprehending a regulating element, a lever for affecting said element, current responsive means for operating said lever, a lever carried independently of the first named lever, voltage responsive means for affecting the second named lever and means whereby the last named lever engages the first named lever to form a compound power increasing lever for affecting the regulating element.

2. Regulating means comprehending a regulating element, a lever for affecting said element, current responsive means for operating said lever, a lever carried independently of the first named lever, voltage responsive means for affecting the second named lever and means whereby the last named lever engages the first named lever to form a compound power increasing lever for affecting the regulating element, the arrangement of the second named lever and its responsive means being such as to affect the regulating element, upon small voltage fluctuations above a predetermined standard.

3. Regulating means comprehending a regulating element, a lever for affecting said element, current responsive means for operating said lever, a lever carried independently of the first named lever, voltage responsive means for affecting the second named lever and means whereby the last named lever engages the first named lever to form a compound power increasing lever for affecting the regulating element, the arrangement of said levers being such as to allow the current responsive means to operate independently in response to fluctuations above a certain standard and render the effects thereof negligible in the process of regulation when the voltage responsive means is effective and the current fluctuations are below the said standard.

4. Regulating means comprehending a regulating element, rotatable means for affecting said element, current responsive means affecting said rotatable means, a second rotatable means having a different center of rotation than the first named rotatable means, and permitting independent rotation of the first-named rotatable means, voltage responsive means for operating the second rotatable means and means whereby said last named rotatable means engages the first named rotatable means to form a compound power increasing lever under predetermined conditions of the voltage responsive means.

5. Regulating means comprehending a regulating element, a lever for affecting said element, current responsive means for operating said lever, a lever with respect to which the first-named lever is capable of certain independent motion, voltage responsive means for affecting the second-named lever, the arrangement of said levers being such that the second-named lever may engage the first-named lever to form therewith a compound power-increasing lever-device for affecting the regulating element.

6. Regulating means comprehending a regulating element, a lever for affecting said element, current responsive means for affecting said lever, a lever carried independently of the first named lever, voltage responsive means for affecting the second-named lever, the arrangement of said levers being such that the second-named lever may engage the first-named lever to form a compound power-increasing lever for affecting the regulating element and allow the current responsive means to operate the first-named lever independently of the second-named lever in response to fluctuations in current above a certain standard and render the effects thereof negligible in the process of regulation when the voltage responsive means is effective and the current fluctuations are below said certain standard.

7. Regulating means comprehending a regulating element, rotatable means for affecting said element, current responsive means affecting said rotatable means, independently rotatable means having a different center of rotation than the first-named rotatable means and adapted to engage the first-named rotatable means to form therewith a compound power-increasing lever under predetermined conditions, and voltage responsive means for causing said engagement and operating the compound lever.

8. The combination with a generator and a regulating device for controlling the same, a movable member for affecting the device and current responsive means affected by the operation of the generator for moving said member, of a second movable member and voltage responsive means for moving the same affected by the operation of the generator, said last-named member being adapted to engage the first-named movable member and form together therewith a compound power-increasing lever through which the voltage responsive means affects the regulating device in response to fluctuations in generator voltage.

9. The combination with a generator, a regulating device for controlling the same, a movable member for affecting the device and current responsive means affected by the operation of the generator for moving said member, of a second movable member permitting said first-named movable member to move independently thereof in one direction and adapted to operatively engage the first-named member to restrain its motion in an opposite direction and to form therewith a compound power-increasing lever for controlling the device, and voltage responsive means affected by the operation of the generator for operating said second-named member to affect the regulating device through said compound lever.

JOHN L. CREVELING.